(12) United States Patent
O'Shea et al.

(10) Patent No.: US 8,281,537 B2
(45) Date of Patent: Oct. 9, 2012

(54) MASONRY SUPPORT SYSTEM AND METHOD

(75) Inventors: Alan O'Shea, County Offaly (IE); Niall Mulligan, County Offaly (IE)

(73) Assignee: Coughlan Engineering (Tullamore) Ltd. (IE)

( * ) Notice: Subject to any disclaimer, the term of this patent is extended or adjusted under 35 U.S.C. 154(b) by 0 days.

(21) Appl. No.: 12/994,199

(22) PCT Filed: May 14, 2009

(86) PCT No.: PCT/EP2009/003430
§ 371 (c)(1),
(2), (4) Date: Nov. 23, 2010

(87) PCT Pub. No.: WO2009/141093
PCT Pub. Date: Nov. 26, 2009

(65) Prior Publication Data
US 2011/0061337 A1    Mar. 17, 2011

(30) Foreign Application Priority Data

May 23, 2008   (IE) .................................. S2008/0409

(51) Int. Cl.
*E04B 2/00* (2006.01)
*E04B 5/00* (2006.01)
*E04B 9/00* (2006.01)
(52) U.S. Cl. ........... 52/506.06; 52/235; 52/283; 52/391; 52/489.2; 52/506.05; 248/225.21; 248/235
(58) Field of Classification Search .................. 52/235, 52/489.1, 489.2, 506.05, 506.06, 506.08, 52/506.09, 582.1, 698, 283, 391, 512; 403/353, 403/381, 387; 248/235, 300, 225.21, 200, 248/674, 675
See application file for complete search history.

(56) References Cited

U.S. PATENT DOCUMENTS

| | | | | |
|---|---|---|---|---|
| 3,903,671 A | * | 9/1975 | Cuin et al. | 52/480 |
| 5,181,360 A | * | 1/1993 | Shingler | 52/520 |
| 6,470,647 B2 | * | 10/2002 | Hsueh | 52/764 |
| 7,543,414 B2 | * | 6/2009 | Sourlis | 52/169.5 |

FOREIGN PATENT DOCUMENTS

| | | | |
|---|---|---|---|
| DE | 10117199 A1 | * | 10/2002 |
| EP | 0869232 A | | 10/1998 |
| EP | 1211364 A | | 6/2002 |
| EP | 1375777 A1 | * | 1/2004 |
| EP | 1785546 A | | 5/2007 |
| EP | 1845220 A2 | * | 10/2007 |
| GB | 2242211 A | | 9/1991 |

(Continued)

*Primary Examiner* — Brian Glessner
*Assistant Examiner* — Adriana Figueroa
(74) *Attorney, Agent, or Firm* — Nixon Peabody, LLP; David F. Crosby

(57) ABSTRACT

The invention relates to a masonry support system and method, suitable for bearing the load of a course of brickwork or defined brickwork panels, comprising a horizontal support section (2) in the X-plane for supporting said load; a vertical support section (3) in the Y-plane for affixing to a support structure; characterized in that there is provided integrated Z-axis adjustment means (61) for adjusting said relieving angle system forward or backwards relative to the support structure. The advantage of the present invention is that the system provides integrated Z-axis adjustment. This feature provides a unique level of tolerance compensation for unforeseen site variances. The invention provides a uniquely adjustable and easy to install angle brick masonry support system.

17 Claims, 10 Drawing Sheets

FOREIGN PATENT DOCUMENTS

| | | | |
|---|---|---|---|
| GB | 2255576 A | | 11/1992 |
| GB | 2395497 A | * | 5/2004 |
| GB | 2417039 A | | 2/2006 |
| GB | 2426261 A | | 11/2006 |
| GB | 2448165 A | * | 10/2008 |
| GB | 2456778 A | * | 7/2009 |

* cited by examiner

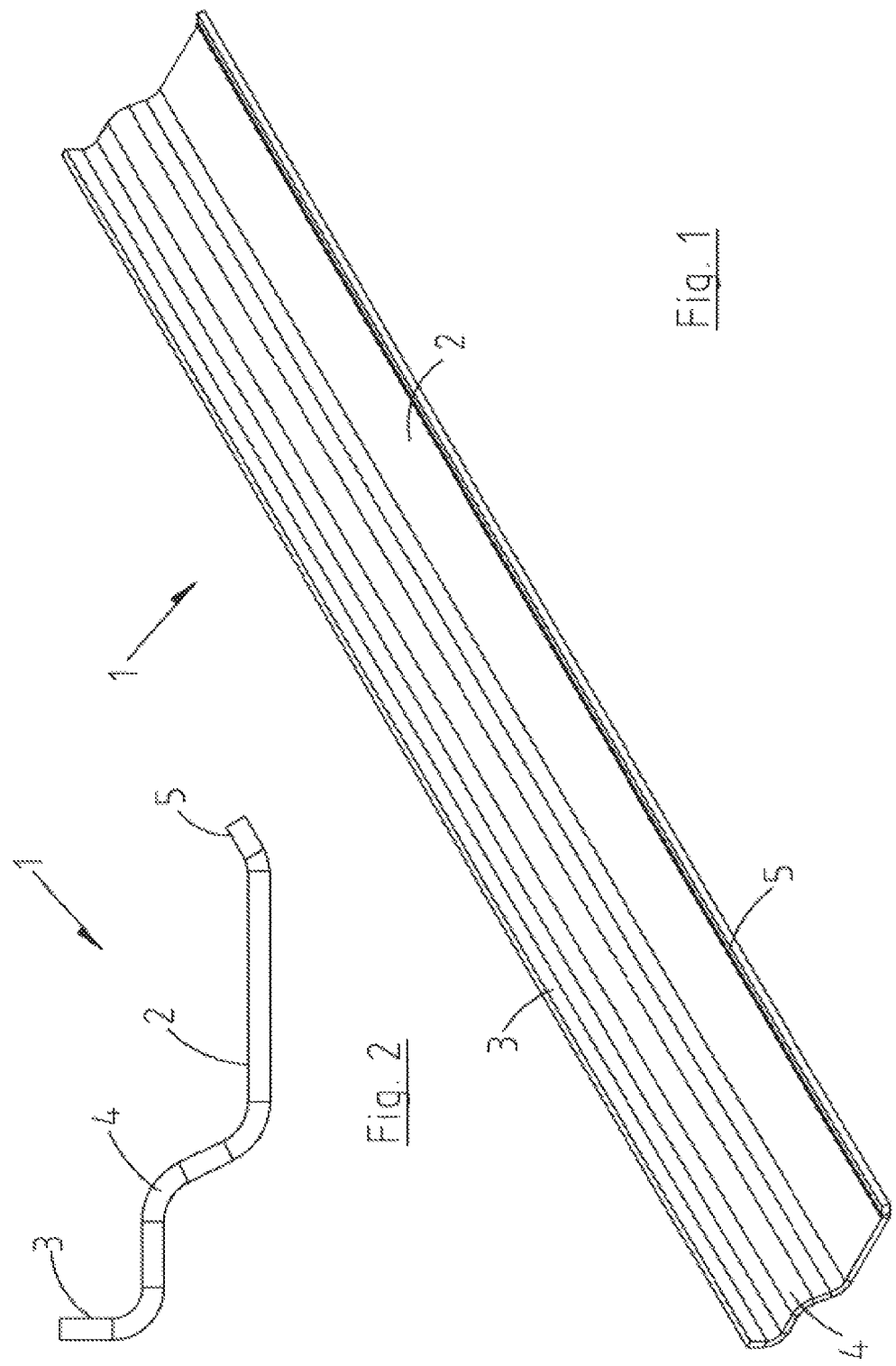

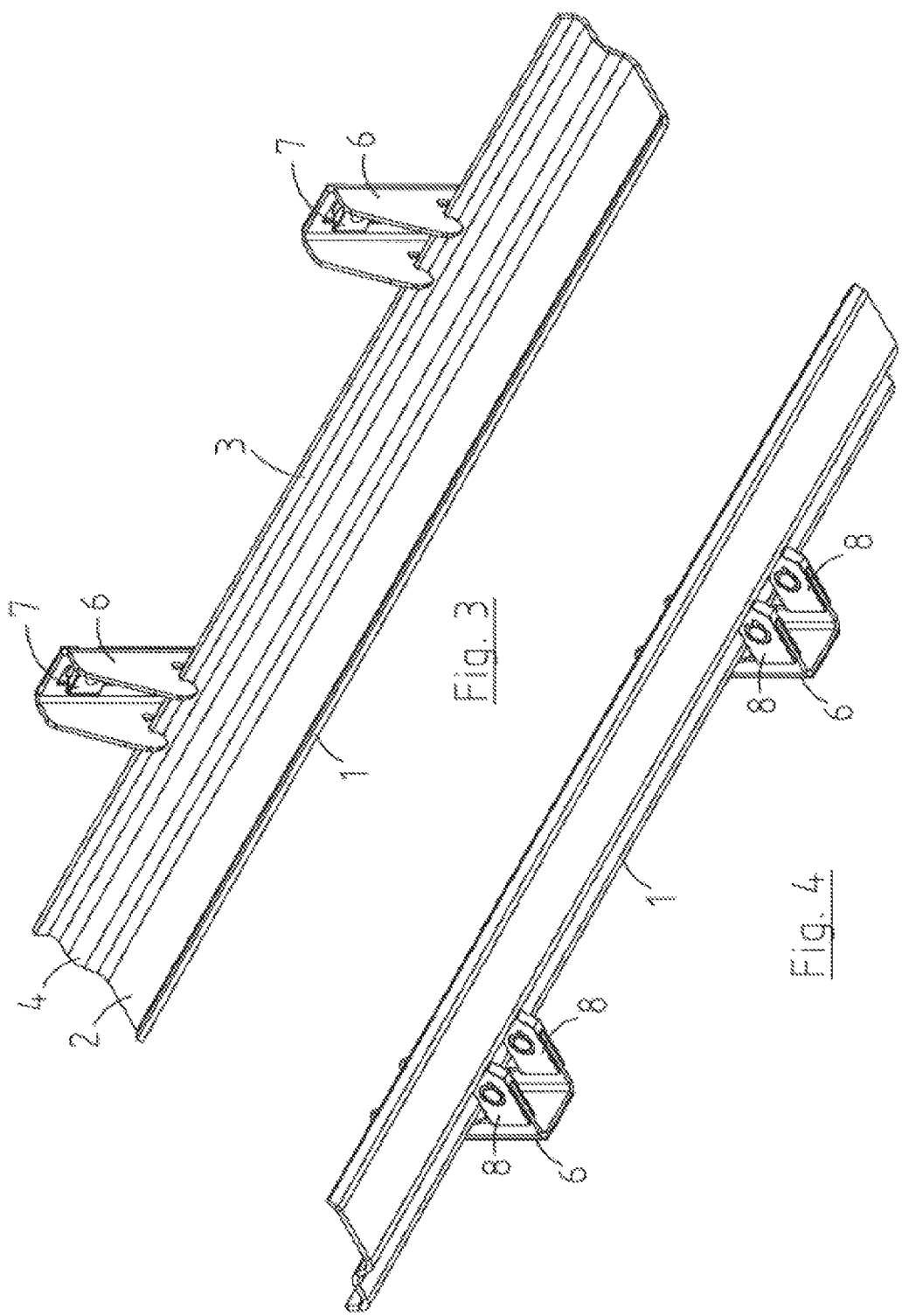

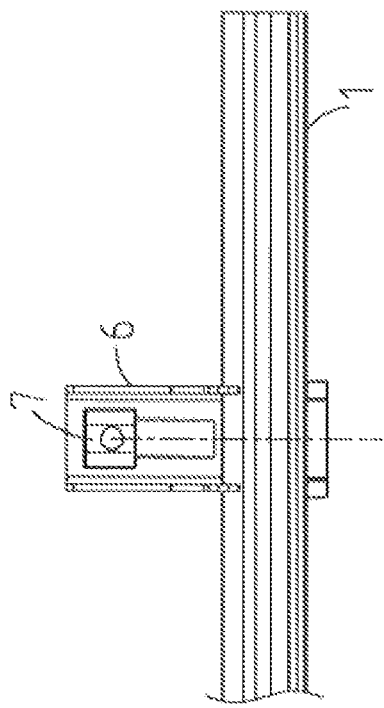
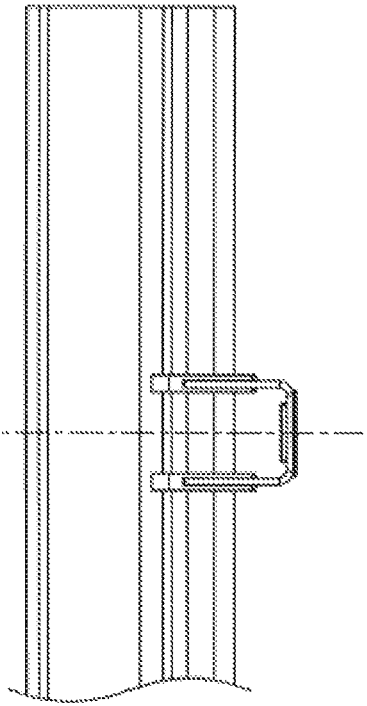
Fig. 5A
Fig. 5B

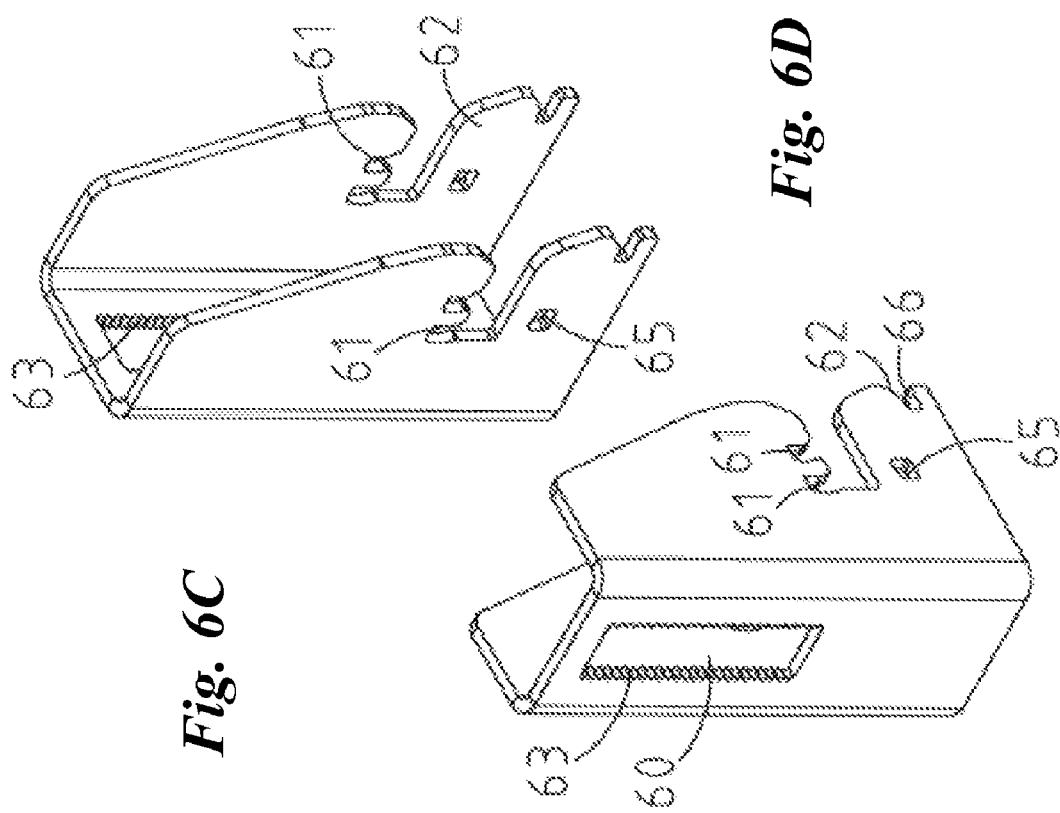

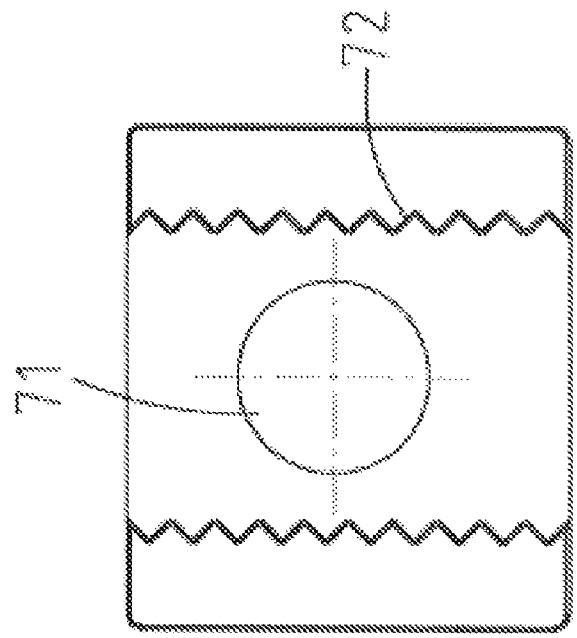
*Fig. 7C*
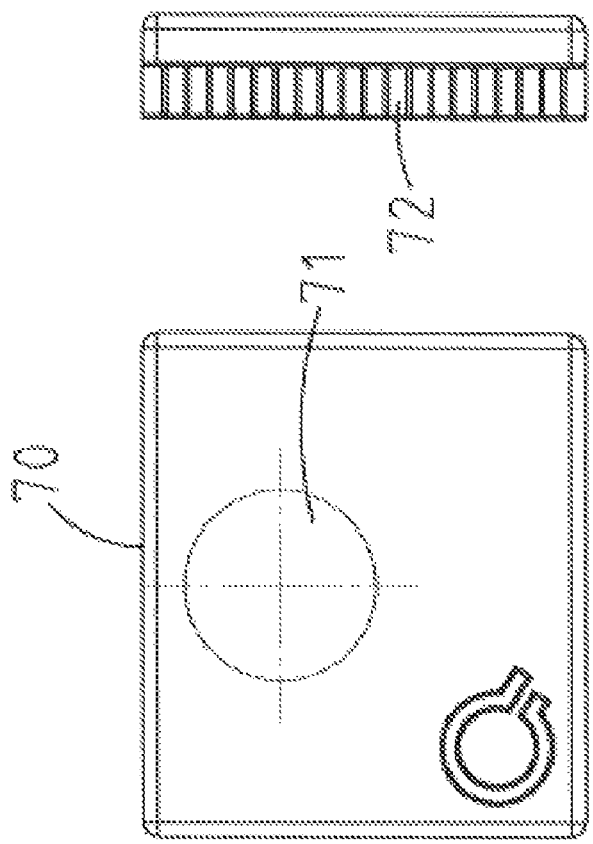
*Fig. 7B*
*Fig. 7A*

*Fig. 8F*
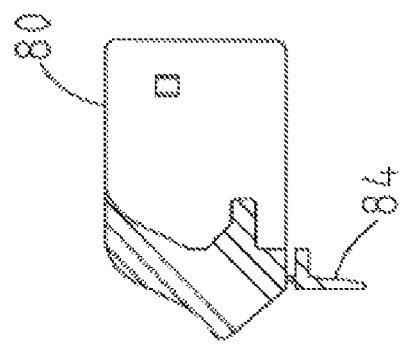
*Fig. 8G*
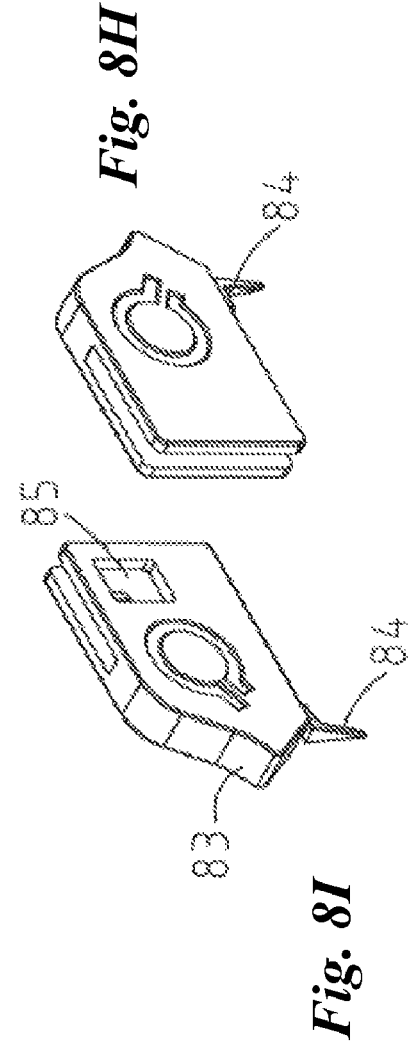
*Fig. 8H*
*Fig. 8I*
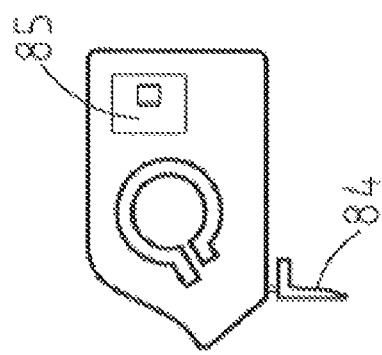
*Fig. 8J*

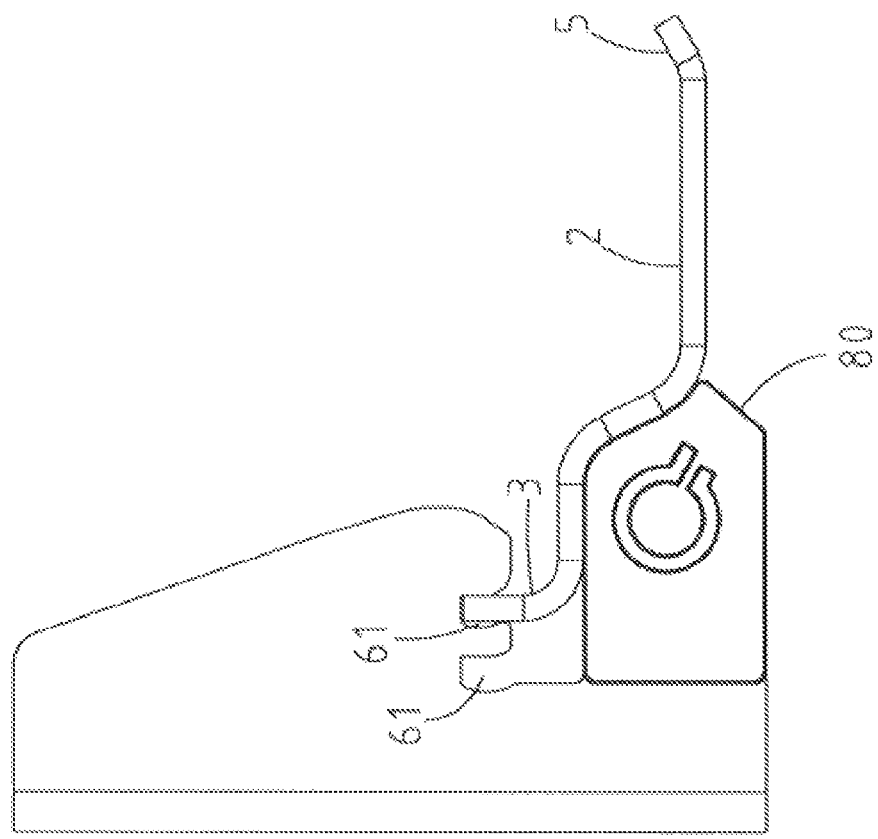
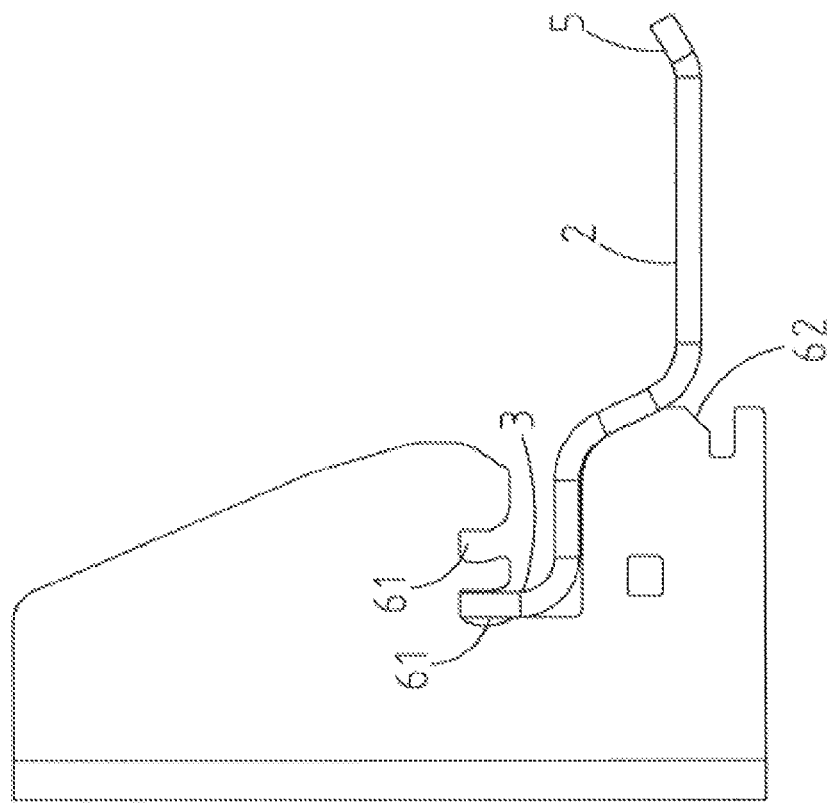

MASONRY SUPPORT SYSTEM AND METHOD

CROSS REFERENCE TO RELATED APPLICATIONS

This application is a 371 National Phase Entry Application of International Application No. PCT/EP2009/003430 filed May 14, 2009, which designates the U.S., and which claims the benefit of priority of Irish Patent Application No. S2008/0409 filed May 23, 2008, the contents of which are incorporated herein by reference in their entirety.

FIELD OF THE INVENTION

The present invention relates to the construction industry, in particular the area of brickwork masonry support and the provision of necessary expansion joints in brickwork facade courses.

BACKGROUND TO THE INVENTION

There is a number of masonry relieving angle systems currently available on the market. For example, Ancon: http://www.ancon.co.uk/main.asp?pageID=30, ACS Atlas: http://www.acsstainless.co.uk and WMB: http://www.wmbstainless.co.uk/A4WmbBrochure.pdf all provide brickwork masonry support systems and are known in the industry.

All of the above systems operate on a similar principle. Folded brackets are fastened to a steel or concrete structure using fasteners or anchors, at varying centres to accommodate varying applied loads. The folded angle pieces are often provided in varying lengths to facilitate greater load requirements. The bracket pieces are supplied in sizes to accommodate a theoretical cavity width between the supporting structure and the brick facade. A typical type of system is described in detail in European Patent Number EP 1 211 364, in the name of Ancon CCL Limited.

UK Patent publication number GB 2 426 261, Wincro, discloses a support for cladding comprises at least one bracket and an elongate support member connected thereto. The elongate support member has a load bearing projecting portion and a root portion. The bracket comprises a support portion for fixing to an existing building structure and at least one side flange projecting from the support portion.

All the existing products on the market are designed to supply the bracket to precise load and cavity customer specification; if there is any variance from this the brackets will either be too long or too short relative to the support wall. All the current systems provide a "fix"for this problem if it is encountered on site. They can provide "shims" or "packing plates" to offset the bracket from the wall to compensate for the cavity being wider than the design intent. However the maximum offset possible is limited to less than or equal to the diameter of the fixing bolt or anchor used. In addition no "negative adjustment"is or can be offered if the wall cavity is less than the theoretical dimension.

The only remedial course with current systems for a narrower than design intent, is to supply a shorter bracket so that the correct distance between the retaining wall and brick facade is obtained.

All of the current bracket systems provide some form of x axis and y axis adjustment; many use serrated washers or punched apertures in the back of the bracket to provide an indexed vertical (y axis) adjustment. In all existing systems the adjustment is limited to the centre distance on the indexing system typically 3 mm.

All existing systems provide folded angle pieces for bearing the load of the brick work, however existing systems make the assumption that the brick panel laid on the angle is sufficiently stiff enough to apply its load uniformly on the angle and brackets, and thus take no account of local loading at the toe of the angle and between the brackets. This can be problematic as there can be insufficient support on the toe at the midpoint between the brackets, thus resulting in sagging and weak spots in the masonry.

There is therefore a need to provide a system and method to overcome the above mentioned problems.

SUMMARY OF THE INVENTION

According to the present invention there is provided, as set out in the appended claims, a masonry support system, suitable for bearing the load of a course of brickwork or defined brickwork panels, comprising a horizontal support section in the X-plane for supporting said load; a vertical support section in the Y-plane for affixing to a support structure; characterised in that there is provided integrated Z-axis adjustment means for adjusting said support angle system forward or backwards relative to the support structure.

The advantage of the present invention is that the system provides positive integrated Z-axis adjustment. This feature provides a unique level of tolerance compensation for unforeseen site variances. The invention provides a uniquely adjustable and easy to install masonry brick work support system. The invention solves conclusively adjustment issues with current systems, thus providing an over arching system that is competitively easier to use and install, and, more flexible and forgiving on site than currently available systems. The invention provides a simple cost effective solution to the problems currently being experienced in the industry.

In a preferred embodiment the Z-axis adjustment means comprises at least two slots positioned in said vertical support section, each slot is adapted to receive the horizontal support in use, such that selection of one slot to receive the horizontal support adjusts said relieving angle system forward or backwards relative to the support structure.

Suitably, the vertical support comprises means for attaching to a bracket for affixing to said support structure, wherein said bracket comprises means for adjusting said vertical support in an up or down direction relative to said support structure in use.

In a further embodiment of the present invention, the bracket adjusting means comprises a keyed lock and washer to provide a coarse adjustment of said bracket relative to the support structure. The adjusting means may comprise means for locating a fixing opening off-centre relative to said keyed lock and washer. In one embodiment of the present invention, in use, the washer can be rotated 180 degrees such that the off-centre opening provides a fine adjustment of said vertical support in an up or down direction relative to said support structure, depending on which way the washer is inserted in the keyed lock.

The lock-washer mechanism, as shown in FIGS. 6 and 7, can provide 0 to 50 mm adjustment in the Y-axis in 1-2 mm increments, which is very advantageous. The novel design of the keyed lock-washer provides coarse adjustment in 3 mm increments. The invention can provide finer 1 mm adjustment by locating the fixing opening or hole in the system lock washer off centre so that the fixing opening or hole is non-symmetrical about the horizontal axis of the washer when engaged. During installation rotating one or a pair of washers through 180 degrees can provide the necessary adjustment. For example, rotating a single washer either clockwise or anticlockwise can adjust the bracket in either direction in the Y-axis. The bracket adjusting means can comprise a serrated toothed area to contact said washer. This improves fine adjustment capabilities and provides for an increased contact area with the lock washer, which improves shear load capacity.

It will be appreciated that the horizontal support section can be adjusted left or right relative to said support structure.

In another embodiment of the present invention there is provided a masonry support system, suitable for bearing the load of a course of brickwork or defined brickwork panels, comprising a horizontal support section in the X-plane for supporting said load; a vertical support section in the Y-plane for affixing to a support structure; characterised in that the outer edge of the horizontal support section comprises an upstanding lip to increase the flexural rigidity of said horizontal support section. The up turned lip on the angle provides better distribution of bending than is currently available by similar systems. The upstanding lip or ridge or relief along the outer edge addresses the problem of potential uneven angle loading due to the flexural properties of the unset or uncured brick panel. Suitably, the lip defines a ridge having a dimension of around 1 mm or more. It will be appreciated that the lip or ridge can be formed by rolling the edge of the horizontal support as appropriate. Alternatively the lip or ridge can be formed anywhere on the surface of the horizontal support section.

Suitably, the lip defines a channel or well on the upper surface of said horizontal support for receiving and/or retaining mortar or other bonding material for bonding with said brickwork. The channel or well can capture bonding mortar within the angle and prevent it from dissipating outwards as it becomes compressed. The lip or ridge effectively forms a retaining barrier preventing the mortar from moving out of the channel or well. It will be appreciated that when the brickwork engages with said upper surface of the horizontal support and said lip such that an area is provided for caulking a soft joint formed between different courses of brick or brickwork panels.

In yet another embodiment there is provided a support means for engaging the bracket and underside of the horizontal portion. The support means comprises an extender shoe dimensioned with a slot for engaging with said bracket. The extender shoe can comprise an aperture on the side of the shoe to facilitates production of the retaining tooth. The retaining peg can be attached to said shoe when not in use and adapted to be snapped off from said extender shoe for engaging with said bracket.

In one embodiment the bracket comprises a notch at one end to positively engage with said support means.

Ideally, the load bearing surface of said horizontal support section comprises at least one kink in an upward direction to increase the flexural rigidity of said horizontal support section, or alternatively the kink can be formed in a downward direction. It will be appreciated that the kink can be formed on the horizontal surface using any suitable manufacturing technique.

Preferably, one or both of the slots in the bracket comprises an inner portion dimensioned substantially in the shape of a scallop to receive said horizontal support. The scalloped rear profile allows for easy rotational front loading of the horizontal support angle section.

In one embodiment there is provided a thermal isolation shim, dimensioned to match the profile of part or the whole back of the bracket, such that, in use, said thermal isolation shim is installed between the bracket and the support structure to provide a thermal break.

In another aspect of the invention there is provided a method of providing a masonry support system, suitable for bearing the load of a course of brickwork or defined brickwork panels, comprising the steps of:
supporting said load using a horizontal support section in the X-plane;
affixing a vertical support section in the Y-plane to a support structure;
characterised by the step of:
adjusting said relieving angle system forward or backwards relative to the support structure using an integrated Z-axis adjustment.

BRIEF DESCRIPTION OF THE DRAWINGS

The invention will be more clearly understood from the following description of an embodiment thereof, given by way of example only, with reference to the accompanying drawings, in which:—

FIG. 1 illustrates perspective plan view of part of the masonry support system according to one aspect of the present invention;

FIG. 2 illustrates a side view of FIG. 1;

FIG. 3 illustrates the masonry support system of FIGS. 1 and 2 showing a bracket according to the present invention FIG. 4 illustrates an underside perspective view showing a support means according to a further aspect of the present invention;

FIGS. 5A and 5B illustrate a front view of FIG. 3;

FIGS. 6A-6D illustrate a number of views of another aspect of the present invention;

FIGS. 7A-7F illustrate a number of views of the washer according to the present invention;

FIGS. 8A-8I illustrate a number of views of the support means shown in FIG. 4; and FIGS. 9a and 9b are side views of the system illustrating the operation of the invention.

DETAILED DESCRIPTION OF THE DRAWINGS

Figure 6B:
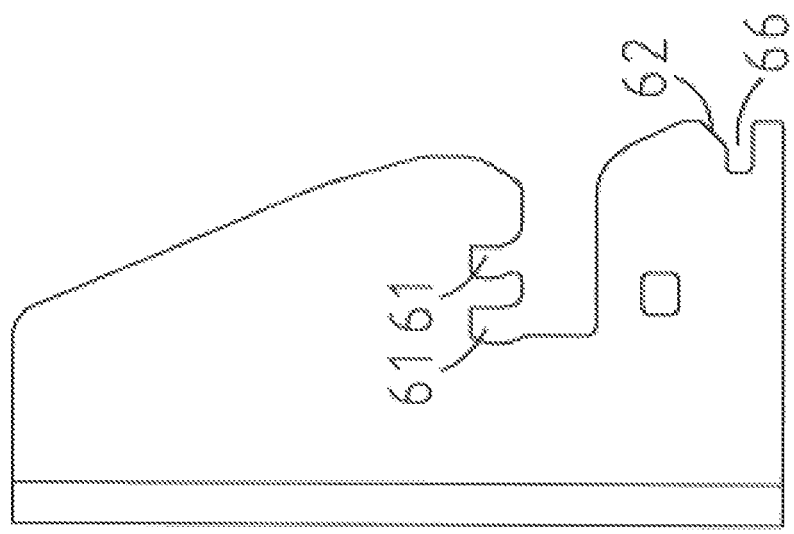

Referring to the drawings and initially FIGS. 1 and 2 there is illustrated an angle support of the masonry support system, indicated generally by the reference numeral 1, for bearing the load of a course of bricks or brick work panels. It will be appreciated that the invention can be applied to all types of masonry or cladding panels or the like that are suitably used in the construction industry. A horizontal support section 2 provides a support for the bricks to be placed on. A vertical support section 3 is adapted to be fixed to a bracket and/or a support wall (not shown). Interposed between the horizontal and vertical supports is a bent (or elbow) support section 4 that provide part of the angle system of the present invention. The angle is suitably of the order of 25 Degrees offset from the vertical. Finally, on the outer edge of the horizontal support 3 there is provided an upstanding lip or ridge portion 5 from the support face of the horizontal portion 2, the operation of which is described in more detail below.

Referring to FIGS. 3 and 4 there is shown the masonry support system engaging with a support bracket 6 according to the invention. The bracket 6 is affixed to a support wall (not shown) through a key lock washer mechanism 7. FIG. 4 shows a perspective underside view of a pair of support members 8 adapted to cooperate with the bracket 6 to provide additional support for the support angle system. FIGS. 5A and 5B show a front view of FIGS. 3 and 4 wherein the bracket can be mounted on a support wall.

Figure 6A:
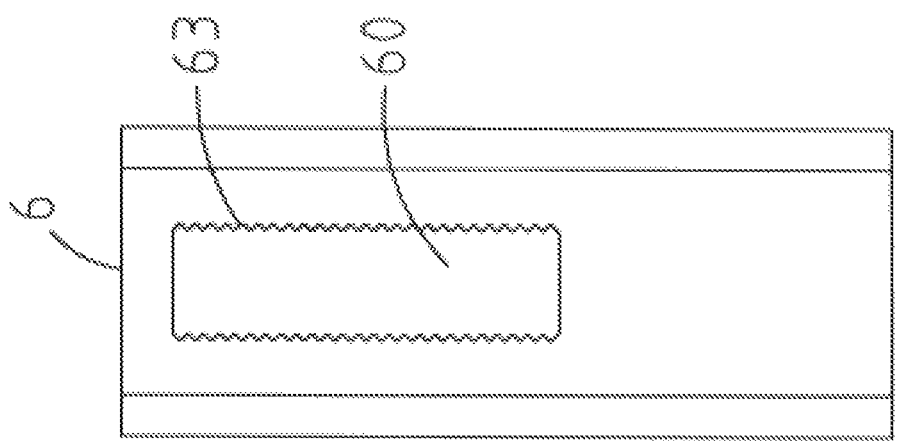

FIGS. 6A-6D illustrate the brack 6 in more detail. The bracket 6 comprises an opening 60 for receiving an affixing means, for example a bolt and a washer, for securing to a support wall. The edges for the opening comprise a series of serrations 63, positioned in a toothed arrangement. It can be shown that the toothed arrangement is preferably of a serrated (for example triangular) shape to provide for an increased contact area with the lock washer, which improves shear load capacity. Alternatively a square edged surface can be used. The bracket further comprises a pair of slots 61 for receiving the support angle system. Each slot 61 comprises a scalloped rear profile to allow for front loading of the angle section. In a preferred embodiment each bracket comprises four slots 61. The bracket is provided with a pair of protruding support members 62 that protrude from the base of the bracket 6. A further notch 66 towards the front of the protruding support member 62 improves the positive engagement with an extender shoe (see below) and minimise the tendency of the shoe to rotate when placed under load conditions.

Figure 7F:
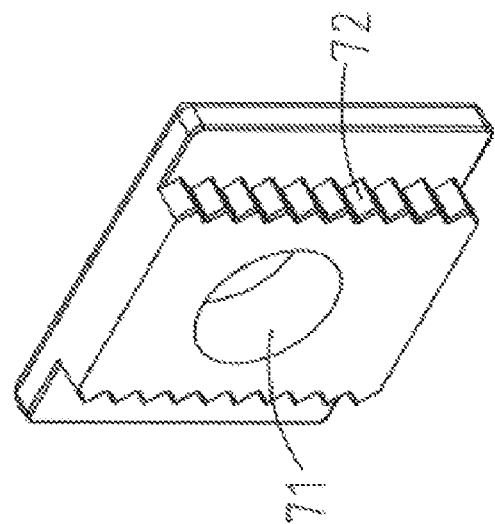
Figure 7E:
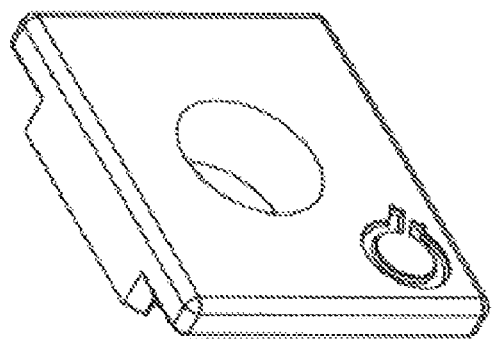
Figure 7D:

FIGS. 7A-7F illustrate an adjusting means according to one aspect of the present invention indicated generally by the reference numeral 70. The adjusting means comprises a washer 70 comprising an opening 71 for receiving a bolt, screw or nail or the like. Protruding from the outer edges of the washer is a series of serrations or teeth 72 and is adapted for engaging with the serrations (triangular) 63 of FIG. 6. In testing, a typical lock washer showed compression and deformation during tightening. It was also difficult to fabricate. To overcome this problem the lock washer is preferably die cast instead of fabricated. The opening 71 can be offset from the centre, for example by 1 mm, guaranteeing +/−1 mm vertical adjustment tolerances, which provides a high degree of accuracy. This unique design feature allows the washer to be rotated by 180 degrees to allow for a fine adjustment. The opening 71 shown in FIG. 7 is clearly shown to be off centre of the washer 70 to facilitate the fine adjusting. The serrated design 72 increases shear load capacity by increasing the contact area. The new lock washer reduces compression and deformation during tightening and does not need to be held in place during this operation, which makes it easier to install.

Figure 8A:
Figure 8B:
Figure 8C:
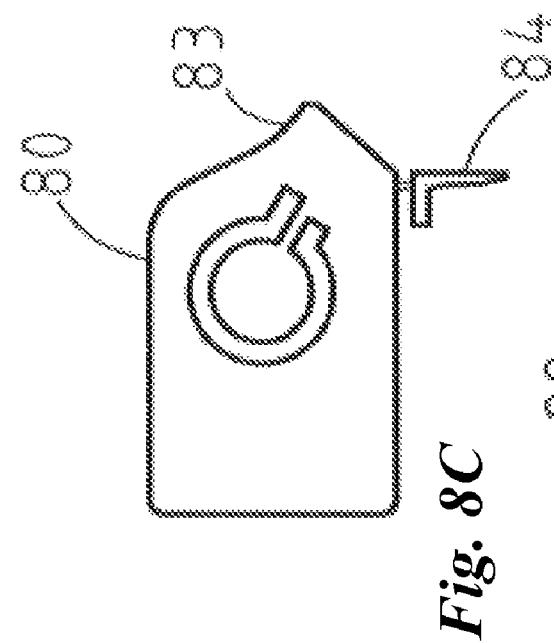
Figure 8D:
Figure 8E:

FIGS. 8A-8I show a support means 80 according to another aspect of the invention. The support means 80 comprises a slot 81 or opening adapted to engage one of the protruding support members 62 of the bracket 6. Positioned on the inner surface of the slot 81 is a locking mechanism 82 for securing the support means 80 to the support member 62. The leading face of the extender shoe 83 mimics the angle profile more closely. This increases the seating area, adding support to the angle to offset any bending. The internal geometry of the shoe 80 has been designed to positively engage with the notch 66 on the bracket's foot. This combats the shoe's tendency to rotate under load. The shoe 80 is designed to engage with the bracket with a snap click on connection. To manufacture the necessary internal clip, an aperture 85 on the side of the shoe 80 is provided. A retaining peg 84 is also provided attached to the shoe. This is designed to be snapped off on site and inserted between the angle and the scalloped engaging point with the bracket in use. The advantage of the inserted peg 84 is that the peg 84 prevents the angle sliding left or right on the bracket 6.

In operation the angle support system can be secured to the bracket 6 by engaging the slot of the invention. An important aspect of the invention is that the shape of the angle support allow for manoeuvring into position in the Z-plane, i.e. forwards and backwards relative to the support wall. The shape of the elbow 4 and the dimensions of the support member 62 allows for the angle support to be positioned correctly. Referring to FIGS. 9a and 9b there is shown a side view of the Z-axis adjustment in operation. The Z-axis adjustment means comprises at least two separate slots 61 positioned in the bracket 6, each slot 61 is adapted to receive the horizontal support 2. FIG. 9a shows on the left hand side the horizontal portion engaging with the inner slot to form the masonry support angle system. If the horizontal portion needs to be adjusted backwards relative to the support wall the horizontal portion is simply pulled back to engage the outer slot 61, thus providing the Z-axis adjustment. It will be appreciated that the adjustment can work in either a forward or backward direction, depending on the adjustment required. In the outer position the extender shoe 80 (described above) provides support for the horizontal section in use.

The bracket 6 comprises means for adjusting the vertical support in an up or down direction relative to said support structure in use by providing an optional coarse or fine adjustment. The bracket adjusting means comprises a keyed lock washer to provide a coarse adjustment of said bracket relative to the support structure. This is illustrated in FIG. 6 wherein the serrated edge provides a keyed lock. In use, during installation rotating the washer through 180 degrees can provide a fine adjustment. The orientation of the washer can be selected by the installer depending whether a fine adjustment is required. For example, rotating a single washer either clockwise or anticlockwise can adjust the bracket in either direction in the Y-axis relative to said support structure.

The lock-washer mechanism can provide 0 to 50 mm adjustment in the Y-axis in 1-2 mm increments, which is very advantageous. The novel design of the keyed lock-washer provides coarse adjustment in 3 mm increments. The invention can provide finer 1 mm adjustment is achieved by locating the opening 71 in the system lock washer off centre so that the opening is non-symmetrical about the horizontal axis of the washer when engaged. During installation rotating one of a pair of washers through 180 degrees can provide the adjustment.

It will be appreciated that the horizontal support section can be adjusted left or right relative to said support structure by sliding the angle support along its X-axis relative to the bracket.

An important aspect of the invention is that the outer edge of the horizontal support section 2 comprises an upstanding lip 5 to increase the flexural rigidity of the horizontal support section 2. The upturned lip 5 on the angle provides better distribution of bending than is currently available by similar systems. The upstanding lip 5 or ridge along the outer edge addresses the issue of uneven angle loading due to the flexural rigidity being increased.

A further advantage of the lip 5 is that it will be appreciated that the lip 5 defines a channel or well on the upper surface of horizontal support 2 for receiving mortar or other bonding material for bonding with a brick or a course of bricks. The channel or well can capture bonding mortar within the angle and prevent it from dissipating outwards as it becomes compressed by the brick when applied to wet mortar.

The support means 80, 81 for engaging the bracket legs 62 and underside of the horizontal portion is another important aspect of the invention. The support means comprises an extender shoe dimensioned with the slot 81 for engaging with the bracket legs 62, i.e. the protruding support members 62 shown in FIG. 6. The bracket leg 62 comprises an indentation 65 for receiving an inclined protrusion 82 positioned on the inner surface on said slot, such that the protrusion 82 locks with the indentation in a snap-fit connection to lock the extender shoe 80 with the bracket leg 62. It will be appreciated that the extender shoe 80 can be moulded from any type of material, for example plastic.

Referring again to FIGS. 9a and 9b the invention provides a thermal isolation shim 90 dimensioned to match the profile of the back of the bracket and is installed between the bracket and the wall to provide a thermal break. The shim 90 is more efficient than stainless steel or metal resulting in reduced thermal bridging and inhibits the development of bi-metallic corrosion. It will be appreciated that deeper (thicker) or multiple thermal isolation shims 90 can be used to provide additional positive forward adjustment across the cavity up to and including the diameter of the fixing bolt.

In another embodiment of the present invention one or both of the slots 61 comprises a gap dimensioned substantially in the shape of a loop (not shown) to reduce the stress on said system in use. It will be appreciated that in both of these positions, the horizontal portion when loaded applies a resultant reaction force to the slots 61 or "tabs", which provide the restraining that prevents the angle from rotating off the bracket 6. The resultant force applied to the tabs is dissipated effectively by the inclusion of the gaps dimensioned in the form of loops at the end of the faces directing resultant stresses away from the slots. These gaps or loops preclude any sharp corners which are known to be stress raisers, thus increasing the overall design efficiency in terms of its load bearing capacity.

In a further embodiment of the present invention there is provided a method of manufacturing the angle support 1. Heretofore, angle supports are typically folded or pressed or crimped. This process is difficult especially for steel angle supports above a particular thickness. The inventors of the present invention have designed the shape of the angle support to be rolled, as illustrated in FIG. 1. By rolling sheets of metal (typically steel) large angle supports in length are possible (over 6 meters). The rolling process is much more efficient to produce longer lengths of the steel angle or section than current available processes/methods. In addition the bracket 6 can be made using a stamp process and then folded to form the bracket according to the invention. Advantage of the stamping is that it reduces the sharp edges on the bracket and provides a considerable commercial advantage in terms of the efficiencies involved in producing the bracket.

In this specification the term 'masonry support system' is used to encompass any masonry relieving, masonry angle, or masonry shelf system and should be interpreted broadly to include or comprise any system suitable for bearing the load of a course of brickwork or defined brickwork panels The invention is not limited to the embodiments hereinbefore described but may be varied in both construction and detail.

The invention claimed is:

1. A masonry support system, suitable for bearing the load of a course of brickwork or defined brickwork panels, comprising:
    a horizontal support section in the X-plane for supporting said load;
    a vertical support section in the Y-plane for affixing to a support structure;
    characterized in that there is provided:
    integrated Z-axis adjustment component adapted for adjusting said horizontal support section forward or backwards relative to the support structure; and
    wherein said Z-axis adjustment component comprises at least two slots positioned in said vertical support section, each slot is adapted to receive the horizontal support in use, such that selection of one slot to receive the horizontal support adjusts said horizontal support section forward or backwards relative to the support structure; and
    wherein the vertical support section includes a bracket for engaging an underside of the horizontal support section and the bracket comprises a positive engaging extender shoe dimensioned with a slot for engaging said bracket.

2. The masonry support system as claimed in claim 1 wherein one or both of the slots comprises an inner portion dimensioned substantially in the shape of a scallop to receive said horizontal support.

3. The masonry support system as claimed in claim 1 wherein a scallop shaped portion receives a retaining peg engaging with said bracket to prevent lateral movement of said horizontal support.

4. The masonry support system as claimed in claim 1 wherein said vertical support section comprises a washer engaging the bracket for affixing the vertical support section to said support structure, wherein said bracket comprises an opening for adjusting said vertical support in an up or down direction relative to said support structure in use.

5. The masonry support system as claimed in claim 1 wherein said vertical support section comprises a washer engaging the bracket for affixing the vertical support section to said support structure, wherein said bracket comprises an opening for adjusting said vertical support in an up or down direction relative to said support structure in use, wherein the washer comprises a keyed lock washer to provide a coarse adjustment of said bracket relative to the support structure through said opening.

6. The masonry support system as claimed in claim 4 wherein the washer comprises a fixing opening located off-centre relative to said washer.

7. The masonry support system as claimed in claim 4 wherein the washer comprises a fixing opening located off-centre relative to said washer such that, in use, the orientation of said washer provides a fine adjustment of said vertical support in an up or down direction relative to said support structure.

8. The masonry support system as claimed in claim 4 wherein a bracket adjusting means comprises a serrated toothed area to contact a washer.

9. The masonry support system as claimed in claim 1 wherein said horizontal support section can be adjusted left or right relative to said support structure.

10. The masonry support system as claimed in claim 1 wherein a retaining peg is adapted for engaging with a bracket to prevent lateral movement of said horizontal support section.

11. The masonry support system as claimed in claim 1 wherein the outer edge of the horizontal support section comprises an up-standing or down-standing lip to increase the flexural rigidity of said horizontal support section.

12. The masonry support system as claimed in claim 1 wherein the outer edge of the horizontal support section comprises an up-standing or down-standing lip to increase the flexural rigidity of said horizontal support section, said upstanding lip defines a channel on the upper surface of said horizontal support for receiving mortar or other bonding material for bonding with said brickwork.

13. The masonry support system as claimed in claim 1 wherein, in use, said brickwork engages with an upper surface of the horizontal support and a lip such that an area is provided for caulking a soft joint between different courses of brick or brickwork panels.

14. The masonry support system as claimed in claim 1 wherein the extender shoe comprises an aperture on a side of the shoe for the provision of an engaging tooth such that said shoe engages said bracket.

15. The masonry support system as claimed in claim 1 wherein the bracket comprises a notch at one end to improve positive engagement with said extender shoe.

16. The masonry support system as claimed in claim 1 wherein the load bearing surface of said horizontal support section comprises at least one kink in an upward or downward direction to increase flexural rigidity of said horizontal support section.

17. The masonry support system as claimed in claim 1 comprising a thermal isolation shim, dimensioned to match the profile of part or the whole back of the bracket, such that, in use, said thermal isolation shim is installed between the bracket and the support structure to provide a thermal break.

* * * * *